A. B. COURCHENE.
PIPE COUPLING.
APPLICATION FILED JAN. 30, 1920.
1,415,157.
Patented May 9, 1922.
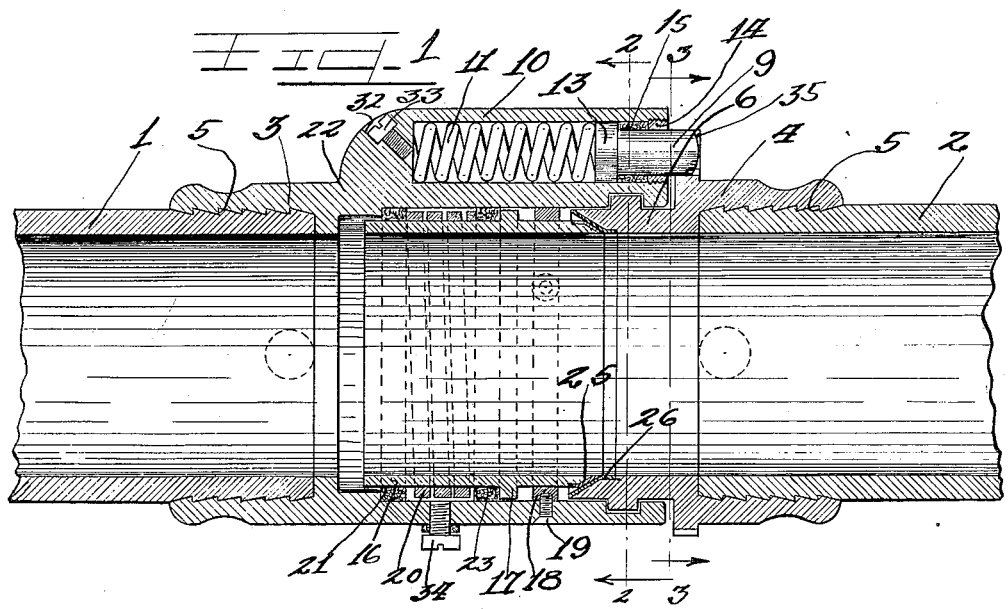
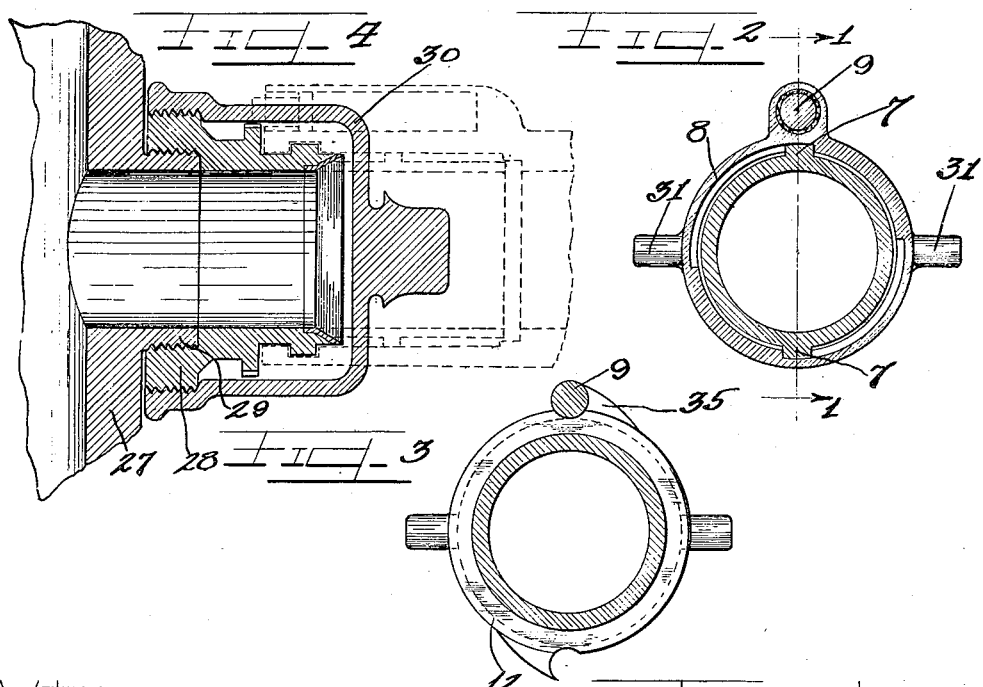

UNITED STATES PATENT OFFICE.

ALBERT B. COURCHENE, OF CHICAGO, ILLINOIS.

PIPE COUPLING.

1,415,157.  Specification of Letters Patent.  Patented May 9, 1922.

Application filed January 30, 1920. Serial No. 355,110.

*To all whom it may concern:*

Be it known that I, ALBERT B. COURCHENE, a citizen of the United States, and a resident of the city of Chicago, in the county of Cook and State of Illinois, have invented certain new and useful Improvements in a Pipe Coupling; and I do hereby declare that the following is a full, clear, and exact description of the same, reference being had to the accompanying drawings, and to the numerals of reference marked thereon, which form a part of this specification.

This invention relates to pipe couplings, more particularly those employed for connecting flexible hose pipes such as are employed by fire departments. For the purpose of connecting the various lengths of fire hose to each other and to the hydrant, simple, strong and quickly attached and detached connecting means must be provided. One of the problems involved is to provide means for quickly connecting the lengths of hose to each other which will at the same time insure a liquid tight joint between the parts of the coupling.

One of the objects, therefore, of the present invention is to provide a coupling having means for readily connecting and disconnecting the parts, and also means for insuring a liquid tight joint between the parts when connected.

A further object of the invention is to provide an improved form of bayonet coupling having means for releasably locking the parts in connected position.

It is also an object of the invention to provide means for automatically sealing the joint between the two parts of a bayonet connection so as to provide a liquid tight coupling.

An additional object of the invention is to provide a coupling in which the parts which are relied on to insure a tight joint are renewable so that they may be replaced when injured without rendering the coupling or the hose useless.

Other and further important objects of the invention will be apparent from the disclosures in the drawings and specification.

The invention (in a preferred form) is illustrated in the drawings and hereinafter more fully described.

On the drawings:

Figure 1 is a longitudinal central section on the line 1—1 of Figure 2 of a coupling embodying the features of the present invention.

Figure 2 is a section on the line 2—2 of Figure 1.

Figure 3 is a section on line 3—3 of Figure 1.

Figure 4 is a vertical section through a part of the hydrant constructed in accordance with the present invention.

As shown in the drawings:

In the form of construction shown in Figures 1 to 3, a coupling is shown adapted to connect two lengths of hose 1 and 2, secured respective to coupling members 3 and 4 by reason of the engagement of the rubber of the hose with a series of shoulders 5 formed on the interior of the members 3 and 4. If desired, engagement between these shoulders and the rubber of the hose may be insured by inserting a sleeve into the ends of the hose adapted to force the rubber into engagement with these shoulders.

The members 3 and 4 are provided with means whereby they may be quickly connected and disconnected. This may be conveniently carried out by means of a bayonet joint construction such as that shown in the present invention. In this case, the member 4 is provided with a sleeve 6 adapted to enter the bore of the member 3. On this sleeve are formed projections 7 adapted to engage grooves 8 on the inner wall of the member 3, as shown more particularly in Figure 1. A channel is provided leading from these grooves 8 to the end of the member 3 through which the projections 7 may be passed in order to bring the latter in and out of engagement with the grooves 8. In connecting the parts 3 and 4, therefore, the projections 7 are inserted through these longitudinally arranged recesses until they enter the grooves 8, whereupon the member 4 is rotated through ninety degrees (90°) to bring the parts into the position shown in Figures 1 and 2. It is desirable that reverse movement of the parts be prevented to avoid accidental disconnection of the coupling. For this purpose, various locking means may be provided, one of the most convenient being a sliding pin mounted for longitudinal movement on one of the members for engagement with a recess, aperture or shoulder on the other of the members. As shown, a pin 9 is slidably mounted on the member 3, a housing 10 being provided therefor. Within this housing is arranged a spring 11 adapted to press the pin 9 outwardly so as to bring it into engagement with one or other of the recesses 12 in the periphery of the member 4. The pin is held in engagement with the housing 10 by means of an enlarged head 13, while a collar 14 is threaded into the open end of the housing for engagement with this head 13, or ring of asbestos, felt or other packing material 15 arranged therebetween to act as a reservoir for lubricant and prevent escape of the lubricant from the housing. Lubricant is used to prevent the spring 11, which is of steel, from rusting, and may be introduced into the housing 10 through an aperture 32 normally closed by a screw 33.

If the end of the pin 9 is unprotected, it may be accidentally disengaged by engagement of a curbstone or the like therewith as the hose is hauled over the ground. Accordingly, a projection 35 is preferably provided on the member 4 adapted to lie against the pin 9 when the latter is in engagement with one of the recesses 12.

In addition to providing means for preventing the two parts of the bayonet connection from becoming accidentally disengaged, it is desirable that means are provided for producing a liquid tight joint between the parts 3 and 4. In the form of construction shown, this joint is provided by employing a sleeve 16 slidably mounted within the member 3 for end-wise engagement with the member 4. This sleeve is provided with an annular projection or rib 17 adapted to engage a ring 18, releasably held in place in the bore of the member 3 by means of screws 19. This ring 18 restricts outward movement of the sleeve 16. Movement of the sleeve in the opposite direction is opposed by the action of a spring 20 arranged between the sleeve 16 and the inner wall of the member 3. The rear end of this spring bears against a packing ring of felt or other material 21 which rests against the shoulder 22 on the inner wall of the member 3. The forward end of the spring rests against a similar felt ring 23 which is supported by the annular projection 17 of the sleeve. The action of the spring 20, therefore, tends to hold the sleeve in an extended position with the projection 17 in engagement with the ring 18. However, when the end of the member 4 is inserted within the member 3 to bring the projections 7 into locking engagement with the groove 8 of the member 3, the end of the member 6 pushes the sleeve 16 inwardly against the action of the spring 20 and thereby produces liquid tight contact between the end of the member 4 and the sleeve 16. The felt rings previously referred to, prevent the passage of water around the other end of the sleeve out through the grooves and other passages which constitute the bayonet connection. Another of the functions of the felt rings is to retain lubricant introduced into the space between these rings from escaping. An oiling aperture is provided in the member 3 normally closed by a screw 34. The engaging faces of the sleeve 16 and the end of the member 4 are preferably beveled in order to aid in their accurate and fluid tight contact, and further are advantageously furnished with seating rings 25 and 26 of comparatively soft material such as brass, copper or lead, or soft alloy.

In the construction shown in Figure 4, the invention is shown as applied to a hydrant 27. In this case, the part 28 corresponds to the part 4 in the construction shown in Figures 1 to 3, and is only different in that instead of being connected to a hose 2, it is threaded onto a nipple 29 projecting laterally from the hydrant, and also by the provision of an externally threaded portion for the reception of a cap 30. The method of bringing the member 3 into and out of engagement with the member 28 is exactly the same as the method of bringing the members 3 and 4 into and out of engagement with each other, so that further description of the form of construction shown in Figure 4 is unnecessary.

The operation is as follows:

The sleeve 6 at the end of the member 4 is inserted within the bore of the member 3 with the projections 7 in alignment with the longitudinal recesses in the member 3. This inward movement of the part 4 relatively to the member 3 presses the sleeve 16 inwardly against the action of the spring 20. As soon as the projections 7 have been brought within the groove 8, the member 4 is given a quarter turn by means of the laterally projecting lugs 31. When the parts have been brought into the position shown in Figure 2, the pin 9 springs forwardly into the recess 12, and releasably locks the parts in position. When it is desired to disconnect the two parts of the coupling, the pin 9 is pushed back against the pressure of its spring 11 by any suitable means, and then the member 4 is given a quarter turn to bring the projection 7 once more into alignment with the longitudinal recess in the member 3, whereupon the member 4 may be withdrawn.

I am aware that many changes may be made, and numerous details of construction may be varied through a wide range without departing from the principles of this invention, and I therefore do not purpose limiting the patent granted otherwise than necessitated by the prior art.

I claim as my invention:

1. In a hose coupling, two cylindrical members, bayonet slots in one of said members, lugs on the other member located to cooperate with said bayonet slots to hold said members together, a casing on the exterior of one of said members, a spring housed in said casing, a plunger pressed by said spring and protruding from said housing toward the other member, a flange on the exterior of said other member located to contact with said plunger and press it toward the interior of said housing when the lugs are introduced into the bayonet slots, said flange having recesses located out of line with the longitudinal parts of said bayonet slots whereby, when the members are rotated relative to one another after the introduction of the lugs into the bayonet slots, the plunger will be brought opposite one of said recesses and the spring will cause it to protrude into said recess, thereby preventing disengagement of said members, a sleeve in the interior of one of said members, a spring between said sleeve and the interior surface of said member, a flange on the exterior of said sleeve bearing against said surface, a shoulder on said surface, the thrust of said spring being exerted against said shoulder and said flange and tending to move the sleeve toward the mouth of said member, packing between said spring and each of said thrust receiving parts, an interior collar secured to said member between said flange and said mouth and acting as a stop to the forward motion of said sleeve, a packing on the forward edge of said sleeve and a packing on the edge of the other member contacting with the packing on the sleeve when the members are united.

2. In a hose coupling, two cylindrical members, bayonet slots in one of said members, lugs on the other member located to cooperate with said bayonet slots to hold said members together, a casing on the exterior of one of said members, a spring housed in said casing, a plunger pressed by said spring and protruding from said housing toward the other member, a packing between said plunger and said housing, an oil hole in said housing, a screw closure for said oil hole, a flange on the exterior of said other member located to contact with said plunger and press it toward the interior of said housing when the lugs are introduced into the bayonet slots, said flange having recesses located in line with the closed ends of the circumferential parts of said bayonet slots whereby, when the rotation of the members relative to one another after the introduction of the lugs into the bayonet slots is finished, the plunger will be brought opposite one of said recesses and the spring will cause it to protrude into said recess, thereby preventing disengagement of said members, a sleeve in the interior of one of said members, a spring between said sleeve and the interior surface of said member, a flange on the exterior of said sleeve bearing against said surface, a shoulder on said surface, the thrust of said spring being exerted against said shoulder and said flange and tending to move the sleeve toward the mouth of said member, packing between said spring and each of said thrust receiving parts, an interior collar secured to said member between said flange and said mouth and acting as a stop to the forward motion of said sleeve, an oil hole in said member between said shoulder and said flange, a screw closure for said oil hole, a packing on the forward edge of said sleeve and a packing on the edge of the other member contacting with the packing on the sleeve when the members are united.

In testimony whereof I have hereunto subscribed my name in the presence of two subscribing witnesses.

ALBERT B. COURCHENE.

Witnesses:
RIDSDALE ELLIS,
EARL M. HARDINE.